United States Patent [19]

Bambara et al.

[11] 3,854,080
[45] Dec. 10, 1974

[54] ELECTRICAL DETENTING APPARATUS

[75] Inventors: Joseph E. Bambara, Brooklyn;
Gustave Pellegrino, Jr., Yonkers,
both of N.Y.

[73] Assignee: Maurer Commercial Products, Inc.,
Long Island, N.Y.

[22] Filed: July 17, 1973

[21] Appl. No.: 379,976

[52] U.S. Cl................ 318/436, 318/466, 318/549
[51] Int. Cl. ............................................. H02p 7/00
[58] Field of Search .......... 318/382, 466, 436, 437, 318/549, 685, 696, 626

[56] References Cited
UNITED STATES PATENTS

| | | | |
|---|---|---|---|
| 3,344,330 | 9/1967 | Belanich et al................ | 318/466 X |
| 3,435,310 | 3/1969 | Bradley.......................... | 318/685 X |
| 3,523,230 | 8/1970 | York............................. | 318/685 X |
| 3,581,182 | 5/1971 | Comstock et al................. | 318/685 |
| 3,715,643 | 2/1973 | Masaki.......................... | 318/466 |

*Primary Examiner*—Gene Z. Rubinson

[57] ABSTRACT

Apparatus for electrically detenting an electrical motor in which actuation of an operator switch means is effective to activate a bistable switching device to a first state and thereby cause energizing potentials to be supplied to motor windings. In order to electrically detent the motor, the operator switch means is released to activate the bistable switching device to a second state which removes the energizing potentials supplied to motor windings and permits, through a detent circuit means, the energization of a single, predetermined winding. A translatable motor member, such as a rotor, is thus translated to a position in alignment with, and is detented at, the location of said predetermined winding.

15 Claims, 2 Drawing Figures

ELECTRICAL DETENTING APPARATUS

This invention relates to electrical detenting apparatus and in particular to apparatus for detenting operation of an electrical motor at a predetermined point in a cycle of motor operation.

It is frequently desirable to provide a capability for inhibiting motion of an operating mechanism at a predetermined position or, at a particular instant of time. For example, in certain applications it is both desirable and necessary to detent the operation of an electrical motor precisely at a predetermined position in order to accurately control a member or device operated thereby. Notably, such a requirement is present during the operation of, for example, photographic equipment in general, and motion picture cameras, in particular. With respect to the latter type of photographic equipment the necessary drive for camera operation is preferably supplied by a suitably energized electrical motor. As is well known in such applications, an electrical motor may drive appropriate mechanisms for supplying film to an exposure station and through suitable gearing and linkage, will control a shutter mechanism to enable a proper exposure of each frame of film in a manner well known to those conversant with the photographic arts.

In certain applications, it is necessary to provide photographic equipment, such as a motion picture camera with a capability of exposing a single frame of film at a time and stopping camera operation at the end of such a frame. In addition, it is important to effect the inhibition of continuous camera operation with the constraints of time and distance defined by a single frame of film. Thus, in photographic applications, wherein it is of primary importance to conserve as much film as possible, wastage of even a few frames of film by the undesired exposure thereof resulting from the failure to promptly inhibit camera operation, cannot be tolerated. Such wastage of film is particularly critical in, for example, aerospace applications wherein the size and weight of all components of photographic and other systems is strictly limited. Furthermore, in order to conserve as much film as possible in the foregoing applications, it has been found necessary to inhibit camera operation at a predetermined point in each cycle of camera operation. Such a point may be ascribed to a particular position of, for example, a reflex shutter mechanism, and by effecting a closure of such a shutter, at the predetermined point, focusing and other adjustments may be conveniently made by an operator prior to the initiation of a filming operation.

Previous attempts to promptly inhibit camera operation have included the dynamic braking of a camera motor and the disconnection of an energizing potential from the camera motor such that the motor is permitted to coast over a particular distance until a rest condition of the motor obtains. Difficulty has been encountered in inhibiting camera motor operation within a single cycle of operation by utilization of the foregoing techniques. In addition, these techniques have rendered it difficult, if not virtually impossible, to effect the inhibition of camera motor operation at a particular point in the cycle of motor operation.

Accordingly, it is an object of the present invention to provide an apparatus for electrically detenting a motor at a particular point in a cycle of motor operation and thereby avoiding the necessity of mechanical clutches, escapements or the like.

Another object of the present invention is to provide an apparatus for electrically detenting a motor operating in either a single cycle mode or operating in a continuous mode.

It is a further object of the present invention to provide an apparatus for electrically detenting a motor by removing energizing potentials from all windings but a single predetermined winding so that a movable member of the motor is affirmatively aligned with respect to said predetermined winding.

It is yet another object of the present invention to provide an apparatus for optically sensing a predetermined point at which a motor is to be electrically detented.

It is still another object of the present invention to provide an apparatus for electrically detenting a motor in response to the action of an operator within a single cycle of motor operation.

It is still a further object of the present invention to provide an apparatus for electrically detenting the motor of a motion picture camera at a predetermined point in a single frame of operation or at a particular point in a frame after continuous camera operation.

It is yet another object of the present invention to provide an apparatus for electrically detenting the motor of a motion picture camera in response to an operator action within a single frame of camera operation and at a predetermined point of a particular frame.

Other objects of the present invention will become apparent from the detailed description of an exemplary embodiment thereof which follows, and the novel features of the present invention will be particularly pointed out in conjunction with the claims appended hereto.

In accordance with one embodiment of the present invention, an exemplary apparatus therefor comprises an electrical motor and drive means for supplying energizing potentials to the motor; mode control means for permitting either single cycle or continuous motor operation; and means for electrically detenting the motor within a single cycle of motor operation in response to the actuation of a switch means during a single cycle or during a cycle following a plurality of cycles of motor operation.

The invention will be more clearly understood by reference to the following detailed description of an exemplary embodiment thereof in conjunction with the following drawing in which.

Figure 1:
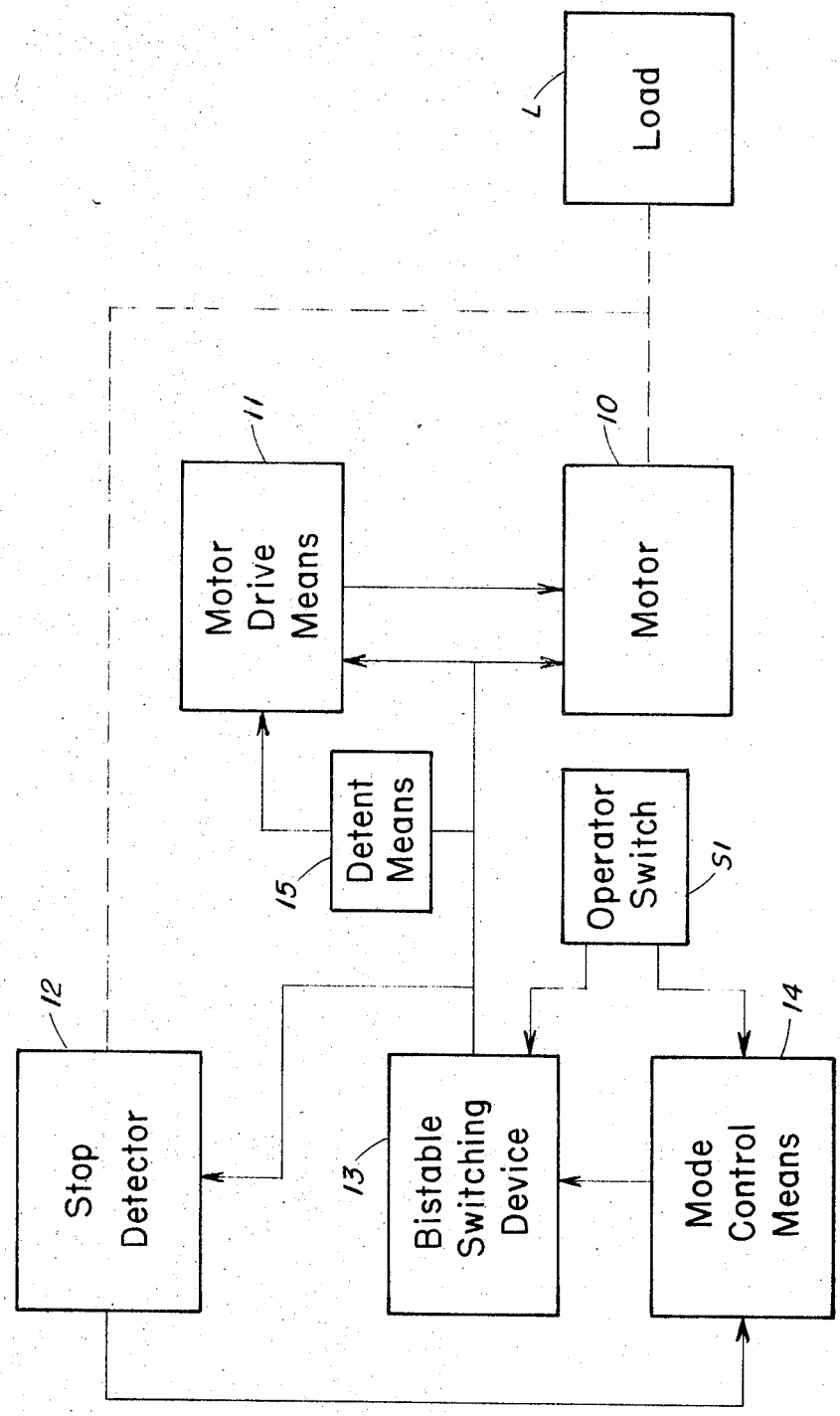
FIG. 1 is a block diagram of an exemplary embodiment of apparatus employing the present invention for electrically detenting a motor.

Referring now to the drawings, and in particular to FIG. 1, illustrated therein is an exemplary embodiment of an apparatus for electrically detenting a motor including motor 10, motor drive means 11, stop detector means 12, bistable switching device 13, mode control means 14, detent means 15, and operator switch means S1. Mode control means 14, which will be subsequently described in detail, is connected to supply an output potential to bistable switching device 13 and is effective to condition operation of the electrical detenting apparatus according to the present invention in either a single cycle mode or in a continuous mode. Operator switch means S1, which may be comprised of a manual push-button switch or a manual spring biased trigger switch, is connected to selectively apply an output voltage to bistable switching device 13 and mode control means 14. As will be described hereinafter, operator switch S1 is effective to couple in known manner either a high potential in the form of a predetermined voltage or a low potential in the form of a ground potential to bistable switching device 13 and mode control means 14. Bistable switching device 13 may be comprised of a known latching relay having a pair of relay coils and a movable contact arm which may be operated between first and second terminals in response to the selective application of suitable energizing potentials applied to corresponding relay coils. Accordingly, the potential supplied by operator switch means S1 is preferably coupled to one coil of bistable switching device 13 and the output of mode control means 14 is preferably coupled to a second coil of device 13. Alternatively, the bistable switching device 13 may take the form of a conventional electrical flip-flop device having an output which assumes a first electrical condition upon application of a first input signal thereto and a second electrical condition upon application of a second input thereto. Thus, bistable switching device 13 may be comprised of an electro-magnetic device such as a latching relay or a solid state switching device comprised of either discrete or integrated circuit components. The output of bistable switching device 13 is connected to motor 10, motor drive means 11, stop detector means 12 and detent means 15. The motor drive means 11 is effective as well be described in detail hereinafter, to supply suitable energizing potentials to motor 10 in response to a predetermined output produced by bistable switching device 13. Motor 10 may take the form of a conventional electrical DC. brushless motor having a plurality of stator windings and which is effective in known manner to drive a movable rotor element in response to the application of appropriate input potentials supplied by motor drive means 11 to the stator windings. The rotor of motor 10 may, for example, be mounted in known manner, on an output shaft which in turn is coupled to a load L and a stop detector means 12 as indicated by the broken lines depicted in FIG. 1. Load L may take the form of known camera drive mechanisms coupled to the output shaft of motor 10 by suitable gearing and linkage elements. For example, when motor 10 is utilized as a motion picture camera, such mechanisms may, for example, include supply and takeup sprockets, shutter mechanisms and a pull-down claw element which suitably engages and is disengaged from motion picture film to be exposed. Additionally, the output shaft of motor 10 is adapted to drive a stop detector means, such as a conventional optical encoding disc, and the electrical energization of detector means 12 may be supplied by the output of bistable switching device 13. As will be described hereinafter, the encoding disc of stop detector means 12 is preferably provided with at least one aperture therein for selectively passing light which is detected as an indication that motor 10 is to be detented. The output of stop detector means 12 is coupled to mode control means 14 for the purpose of enabling the electrical detenting of motor 10 under appropriate circumstances as will be discussed in detail hereinafter.

Detent means 15 is coupled between the output of bistable switching device 13 and motor drive means 11. As will be described in detail hereinafter, detent means 15, which may be comprised of known electric circuit elements, is effective in the absence of the predetermined output of device 13 to cause a single winding of motor 10 to be energized and thereby detent motor 10 at such a winding.

The operation of the exemplary embodiment of the electrical detenting apparatus of the present invention and illustrated in FIG. 1 will now be described. Initially, an operator conditions mode control means 14 to either a single cycle or continuous mode of operation. In the single cycle mode, motor 10 will be energized for one cycle or revolution and will then come to rest at a predetermined position. Thus, assuming that the apparatus is set for a single cycle mode of operation, an operator actuates operator switch means S1 which, in turn, causes bistable switching device 13 to supply an output potential to motor drive means 11 which, in turn, maintains detent means 15 inactive and supplies appropriate energizing potentials to the stator windings of motor 10. As motor 10 operates through a cycle, the elements comprising load L such as a camera drive mechanism, coupled to the output shaft of motor 10, are driven through a single cycle of operation and the encoding disc of stop detector means 12 is likewise rotated. Upon the stop or detenting position of motor 10 being detected by the passage of light through the aperture of the encoding disc of stop detector means 12, an output signal is supplied therefrom to mode control means 14 which, as a result of being conditioned to a single cycle mode of operation, is activated and switches bistable switching device 13 to a second electrical condition. The potential supplied to motor drive means 11 and, therefore, the energizing potentials supplied to the stator windings are thus removed. Detent means 15 is activated in response to the output of device 13 assuming the aforementioned second electrical condition and thereby energizes a single winding of motor 10 which causes the rotor thereof to be aligned with and detented at such winding.

In a continuous mode of operation, mode control means 14 is conditioned for continuous operation to a second state and as long as operator switch means S1 is actuated, bistable device 13 will supply a suitable potential to motor drive means 11 which will enable continuous operation of motor 10. Additionally, the actuation of operator switch means S1 will maintain the conditioning of mode control means 14 such that only upon release or deactivation of operator switch means S1 will mode control means 14 be effective to cause bistable switching device 13 to remove the potential supplied to motor drive means 11 upon the next following output signal supplied to mode control means 14 by optical stop detector 12. In the foregoing manner, deactivation of operator switch means S1 will effect the activation of detent means 15 and the subsequent detenting of electrical motor 10 within a single cycle of operation as described previously with respect to the single cycle mode of operation.

Figure 2:
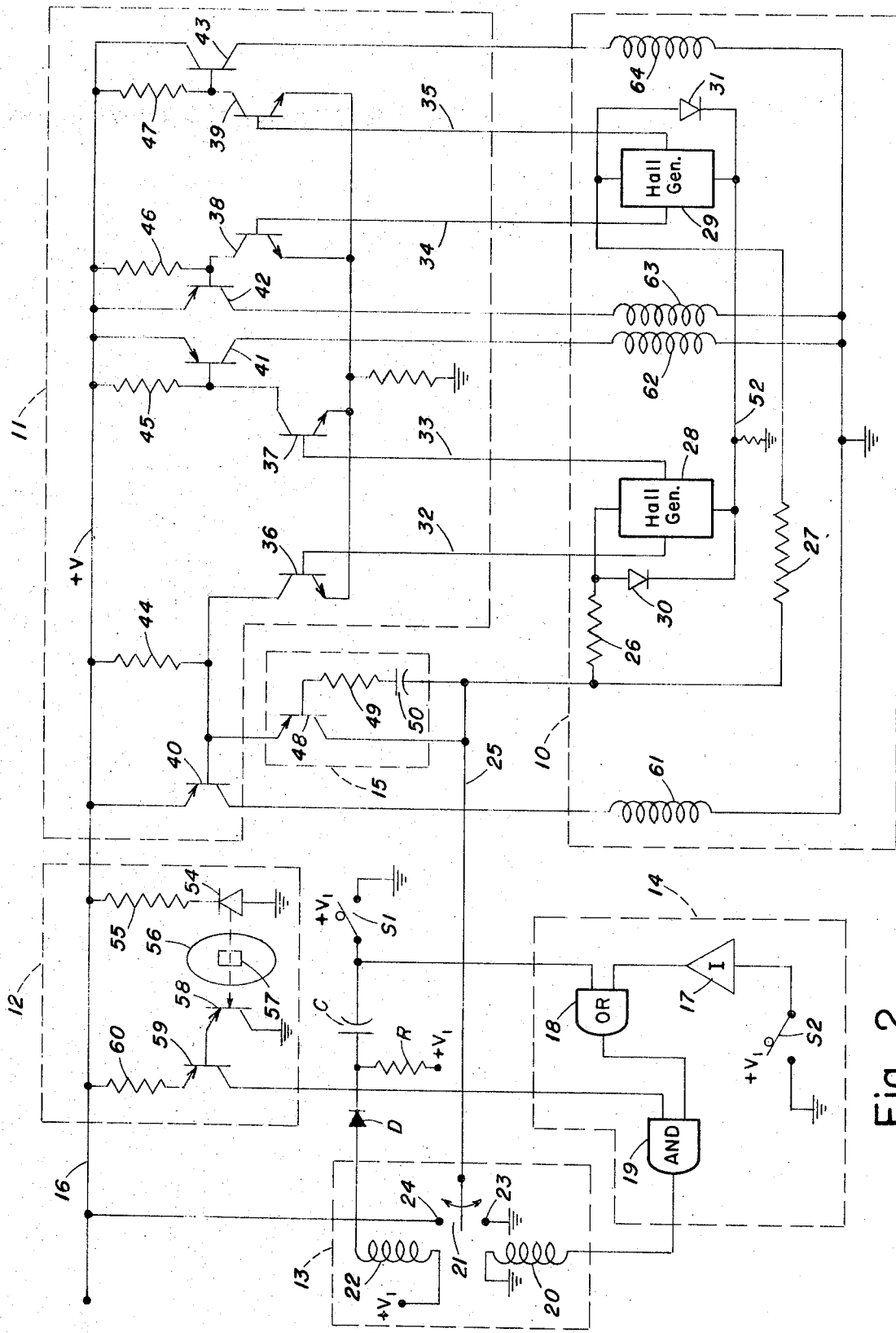
FIG. 2 is a schematic illustration of an exemplary embodiment of electrical detenting apparatus configured in accordance with the teachings of the present invention.

Referring now to FIG. 2, there is illustrated in schematic form an exemplary embodiment of the electrical detenting apparatus of the present invention. The mode control means, which is illustrated in schematic form within the dashed block 14, is comprised of switch means S2, inverter 17, OR gate 18 and AND gate 19.

Switch means S2 may take the form of a conventional manual switch having a contact arm which may be operated between first and second terminals and is effective to selectively supply either a ground potential or a predetermined voltage V1 to the common terminal thereof. The electrical state of switch means S2 is applied as an input to inverter means 17 which, as will be appreciated by those familiar with logic circuits, may comprise a conventional logic inversion circuit which is effective to provide at the output thereof, the inversion of an input potential thereto. The output of inversion means 17 is connected to a first input of an OR gate 18 which may take the form of a conventional logic element which preferably produces a high output potential at the output thereof in response to a high input potential supplied to either a first or second input terminal thereof. Conversely, OR gate 18 will supply a low output potential in response to low potentials supplied to both inputs thereof. The second input terminal of OR gate 18 is connected to the common terminal of operator switch means S1 and upon the activation of switch means S1, a high potential, such as voltage V1, of predetermined magnitude is supplied to the second input thereof. An AND gate 19, which may take the form of a conventional coincident logic element and which operates in the known manner to provide a high output potential upon the coincident application of a high input potential to both first and second inputs thereof is provided with a first input connected to the output of OR gate 18 and a second input connected to the output of stop detector means 12 as will be described hereinafter.

The bistable switching device 13, which as aforesaid may take the form of a conventional latching relay, is preferably comprised of first and second relay coils 20 and 22, a movable contact arm 21, terminals 23 and 24 and a potential source V1. Relay coil 20 is connected between a ground potential and the output of AND gate 19 of mode control means 14 and relay coil 22 is connected between a voltage source V1 and diode D and resistor R with a capacitor C connected to a node between diode D and resistor R and the common terminal of operator switch means S1. Terminal 23 of the latching relay is connected to a ground potential and terminal 24 is coupled through a conductor to line 16 which is maintained at a predetermined voltage V. Accordingly, the bistable switching device 13 is effective to latch conductor 25 to a voltage V or to a ground potential as will be described in detail hereinafter.

An exemplary embodiment of a motor electrically detented according to the teachings of the present invention is illustrated in schematic form within dashed box 10 and may take the form of a conventional DC. brushless motor such as, for example, model No. 1AD-31 commercially available from Siemens American, Inc., New York, New York. In order to provide a clear appreciation of the present invention, motor 10 is illustrated in FIG. 2 as comprised of resistors 26 and 27, Hall generators 28 and 29, voltage limiting means 30 and 31 and stator windings 61, 62, 63, 64. Resistors 26 and 27 are connected between line 25 and the input terminals of respective Hall generators 28 and 29 and serve in the well-known manner as dropping resistors for supplying appropriately valued input potentials to generators 28 and 29. Similarly, voltage limiting means 30 and 31 which may take the form of conventional voltage limiting diodes, such as Zener diodes, are connected between the input of Hall generators 28 and 29, respectively, and a common resistor 52 for the purpose of limiting to acceptable values the voltage supplied to Hall generators 28 and 29 and for providing a measure of temperature compensation thereto. The outputs of Hall generators 28 and 29 are supplied through pairs of conductors 32, 33 and 34, 35, respectively, to motor drive means 11. It is realized that the aforementioned Hall generators are effective to sense electromagnetic fields produced by stator windings 61 to 64 and in response to the polarity of particular fields sensed, Hall generators 28 and 29 provide appropriately commutated voltages in the well-known manner, through conductors 32–35 to motor drive means 11. It is also realized that although a brushless DC. motor 10 utilizing Hall generators 28 and 29 as commutating means is preferred, motor 10 may comprise a conventional DC. motor utilizing a well-known slip ring and brush commutation configuration. However, in view of the wear and limited life of the latter commutation means, a brushless DC. motor as depicted in FIG. 2 is preferred.

Motor drive means 11 is comprised of amplifying means 36–39, switching means 40–43, resistors 44–47. A detent means 15 is comprised of amplifying means 48, resistor 49 and capacitor 50. Amplifying means 36–39 may take the form of any known amplifying device, such as a transistor as illustrated in FIG. 2, which operates in the well-known manner to increase the magnitude of an input signal supplied thereto. Conductors 32–35 are connected to the base electrode of corresponding amplifier means 36–39 with the output, or collector electrode, of each amplifying means connected to the base electrode of a respective switching means 40–43. Each of resistors 44–47 is connected at one end thereof to the predetermined voltage V applied to line 16 and at the other end thereof to the base electrode of respective switching means 40–43. It will be understood that switching means 40–43 may take the form of any known electrical circuit device such as driving transistors, silicon-controlled rectifiers or the like, which may be rendered conductive or non-conductive in response to appropriate input signals applied thereto in order to selectively couple respective stator windings 61–64 to the voltage V supplied to line 16.

Detent means 15 is comprised of an amplifying means 48 connected between the base of switching means 40 and line 25 and a resistor 49 and capacitor 50 connected in series between the input of amplifying means 48 and line 25. Amplifying means 48 may take the form of a conventional transistor amplifier similar to amplifying means 36–39. It will be realized that although motor drive means 11 has been described as comprised of discrete circuit elements, such as transistors and resistive elements, such components may be configured in integrated circuit form.

In operation, upon the latching of line 25 to voltage V applied to line 16, appropriate input voltages are applied to Hall generators 28 and 29 through corresponding input resistors 26 and 27. Appropriately commutated output voltages are supplied in the well-known manner by Hall generators 28 and 29 through conductors 32–35 to amplifying means 36–39 of the motor drive means 11. Assuming, for example, that a commutated output signal is supplied through conductor 32 to the base of transistor 36, such an output signal is amplified and applied as an input signal to switching means 40 which, in turn, is rendered conductive and thereby causes voltage V to be supplied to stator winding 61. In this manner, the rotor (not shown) of motor 10 is rotated to a predetermined extent and upon the production of commutating output signals supplied through conductors 33, 34 and 35 windings 62, 63 and 64 are energized to supply the torque necessary to translate the rotor of motor 10.

It is realized that although motor 10 is depicted as comprised of two Hall generators 28 and 29 and four stator windings 61–64, other configurations of Hall generating devices, amplifying and driving means, and stator windings may be utilized. For example, a DC. brushless motor 10 may be comprised of four Hall generators, eight amplifying and switching means and eight stator windings.

Stop detector means 12 is preferably comprised of a radiation source 54, resistors 55 and 60, and optical encoding disc 56, radiation responsive means 58 and switching means 59. Radiation source 54, which may take the form of a conventional light emitting or electroluminescent diode, is connected in series with resistor 55 between conductors 16 and 25. It will be realized that radiation source 54, which may take the form of a conventional light emitting or electroluminescent diode, is connected in series with resistor 55 between conductors 16 and 25. It will be realized that radiation source 54 operates in the conventional manner to produce radiation, preferably in the light spectrum in response to an appropriate energizing voltage applied thereto. A suitably defined aperture 57 is provided in encoding disc 56 which, in turn, is rotated by an output shaft (not shown) of motor 10 and is effective to intermittently pass the radiation emitted by radiation source 54 to radiation responsive means 58 upon alignment of aperture 57 with radiation source 54. Thus, upon the application of an energizing potential to radiation source 54, a single pulse of radiation, such as light, will be passed through aperture 57 of disc 56 during each rotation of disc 56 and, consequently, during each cycle of the operation of motor 10. In addition, timing slots or apertures (not shown) may be conveniently formed in disc 56 for the purpose of generating signals for controlling the speed of motor 10.

Radiation response means 58 may take the form of a conventional photo transistor which in known manner is effective to produce an output voltage upon the application of incident light thereto. A switching means 59, which may take the form of a conventional transistor element, is preferably connected in series with a resistor 60 between line 16 and the second input of AND gate 19 of mode control means 14. Switching means 59 operates in the known manner to supply a high level output produced at the collector electrode thereof to the aforementioned input of AND gate 19 in response to the application of an input signal applied to its base electrode by radiation responsive means 58. Resistor 60 comprises a known dropping resistor, the value of which is selected such that the magnitude of the output signal supplied by switching means 59 to AND gate 19 is consistent with the acceptable magnitude of voltages that may be safely applied to AND gate 19. It will be appreciated, however, that utilization of dropping resistor 60 is optional and may be dispensed with in the event that voltage V may be safely applied to an input of AND gate 19.

The operation of the electrical detenting apparatus illustrated in FIG. 2 will now be described. Initially, a single cycle or continuous mode of operation is selected by operating switch means S2 in the following manner. In order to effect, for example, a single cycle mode of operation, switch means S2 is operated such that the contact arm thereof is connected to a ground potential. The input to inverter means 17 is of a low potential and, accordingly, a high potential is supplied to the first input of OR gate 18 which, in turn, is passed as a high potential to the first input terminal of AND gate 19. Operator switch means S1 is now manually actuated such that the contact arm thereof is connected to a ground potential thereby charging capacitor C and momentarily energizing relay coil 22. Energization of relay coil 22 is effective to couple contact arm 21 to terminal 24 and thereby supply voltage V to conductor 25. At this point, capacitor C is fully charged and relay coil 22 is de-energized such that upon release of operator switch means S1, capacitor C is discharged although diode D inhibits the re-energization of relay coil 22. It will be appreciated, however, that switch means S1 does not have to be released in the single frame mode and due to the latching operation of bistable switching device 13, contact arm 21 remains coupled to terminal 24 even though the energization of relay coil 22 is removed and line 25 is latched to the voltage V applied to conductor 16. The voltage V is supplied through resistors 26 and 27 to Hall generators 28 and 29, respectively, which, in turn, supply appropriately commutated output signals through conductors 32–35 to corresponding amplifying means 36–39. As described hereinbefore, the output signals produced by amplifying means 36 to 39 are effective to render corresponding ones of switching means 40–43 conductive for appropriate intervals of time and thereby energize stator windings 61 to 64. Energization of the stator windings of motor 10 is effective to place the rotor (not shown) and output shaft thereof in motion which, in turn, causes rotation of encoding disc 56. Upon the alignment of aperture 57 with radiation source 54 and radiation responsive means 58, communication is established therebetween. An output signal is thereby produced by radiation responsive means 58 which signal is effective to render switching means 59 conductive and thereby supply an appropriately valued potential to the second input of AND gate 19. Thus, high potentials are supplied to both inputs of AND gate 19 thereby activating AND gate 19 and supplying an energizing potential across relay coil 20. Contact arm 21 is operated by the electromagnetic field produced by the energization of relay coil 20 and is coupled to contact 23 thereby lowering the potential of line 25 to a ground potential. The energizing voltage V previously supplied to resistors 26 and 27 as the input voltage of corresponding Hall generators 28 and 29 is now removed and consequently switching means 40–43 are rendered non-conductive thereby inhibiting the application of energizing voltage V to stator windings 61 to 64. However, as a potential difference of V volts now exists across resistor 44 and amplifying means 48 of detent means 15, capacitor 50 is charged toward voltage V. As capacitor 50 is charged, the charging current is amplified by amplifying means 48 which is effective to render switching means 40 conductive and thereby supply the energizing voltage V to a single stator winding 61 of motor 10. Accordingly, stator winding 61 will produce a torque which will align the rotor of motor 10 therewith and retain the rotor in such an alignment as corresponding torques are not produced by the remaining stator windings 62–64. Thus, the rotor of motor 10 is detented at a predetermined position, namely in alignment with a particular stator winding such as winding 61. In addition, the aforementioned electrical detenting operation is effected within a single cycle of operation of motor 10 as a detenting signal is detected within a single revolution of encoding disc 56. Thus, motor 10 may be energized for a single cycle of operation and detented at a particular point in such a cycle.

In the continuous mode of operation, the contact arm of switch means S2 is operated to connect a voltage V1 to inverter means 17 which, in turn, supplies a low potential to the first input terminal of OR gate 18. The contact arm of operator switch means S1 is manually actuated to couple a ground potential to relay coil 22 and to the second input of OR gate 18, and this coupling is maintained by an operator as long as operation of motor 10 is desired. Actuation of operator switch means S1 is effective to energize relay coil 22 which, in turn, couples contact arm 21 with terminal 24 and thereby connects conductor 25 to the voltage V supplied to conductor 16. Accordingly, input voltages are supplied through resistors 26 and 27 to Hall generators 28 and 29 such that operation of motor 10 is commenced and maintained as described heretofore. In order to electrically detent the operation of motor 10, operator switch means S1 is released thereby supplying equal voltages V1 to both ends of relay coil 22, or alternatively, removing the potential difference previously applied across the coil. Additionally, voltage V1 is now coupled to the second input of OR gate 18 which supplies a high potential to the first input of AND gate 19. As motor 10 continues to be operated, encoding disc 56 is rotated as aforesaid and upon a communication path being established between radiation source means 54 and radiation responsive means 58 by the alignment of aperture 57 therewith, switching means 59 is rendered conductive thereby supplying a high potential, or enabling, signal to the second input of AND gate 19 which activates AND gate 19. Accordingly, relay coil 20 is energized and couples contact arm 21 to terminal 23 thereby lowering the potential of conductor 25 to a ground level and is effective to remove the energizing potential supplied to Hall generators 28 and 29. Capacitor 50 is charged toward voltage V and the charging current is amplified by amplifying means 48 and is supplied to switching means 40 in the same manner as previously described with respect to the single cycle mode of operation of the present invention. Switch means 40 is rendered conductive and is effective to supply voltage V to stator winding 61 which in turn is energized and produces a torque which aligns the rotor of motor 10 therewith and electrically detents operation of the motor as aforedescribed. It will be realized, therefore, that motor 10 may be continuously operated through a plurality of cycles and upon the release of operator switch means S1, motor 10 is electrically detented within a single cycle of operation.

It will be appreciated that although a particular stator winding, namely winding 61, is described as the winding which defines the position at which the rotor of motor 10 is detented, any one of stator windings 62, 63, 64 could readily be utilized in lieu of winding 61, to define the detenting position. In addition, although inverter means 17, OR gate 18 and AND gate 19 are utilized to control the energization of relay coil 20, alternate logic components well known to those skilled in the art may be utilized in accordance with the teachings of the present invention.

It is realized that amplifying means 48 of detent means 15 may be dispensed with and that resistor 49 may be connected directly between the input electrode of switching means 40 and capacitor 50. It has been found, however, that in the absence of amplifying means 48, a substantially greater value of the capacitance of capacitor 50 is required. As such a larger capacitance significantly increases the overall volume of the electrical detenting apparatus according to the invention, it is preferred to utilize amplifying means 48 and a substantially smaller capacitor 50, as, for example, depicted in FIG. 2.

It will be appreciated by those skilled in the art that suitable control circuitry (not shown) may be provided to control the speed of motor 10 in response to load changes or variations in the magnitude of an input potential. It is also realized that known techniques such as variation of the duty cycle of energizing potentials supplied to stator windings 61 to 64 may be implemented in order to regulate the speed of motor 10.

The foregoing and other various changes in form and details may be made without departing from the spirit and scope of the invention. Consequently, it is intended that the appended claims be interpreted as including all such changes and modifications.

What is claimed is:

1. Apparatus for electrically detenting a translatable member of an electric motor having a plurality of windings at a position defined by the location of a predetermined one of said windings, comprising:
   bistable switching means having an output admitting of a first or second electrical state;
   commutating means responsive to the output of said bistable switching means admitting of aaid first electrical state for providing commutated output signals;
   drive means responsive to said commutated output signals for supplying energizing potentials to said windings; and
   detenting means coupled to the output of said bistable switching means for conditioning said drive means to supply an energizing potential to said predetermined winding when the output of said bistable switching means admits of said second electrical state to detent said translatable member at the position defined by the location of said predetermined winding.

2. Apparatus as defined in claim 1 wherein said detenting means comprises capacitor means coupled to the output of said bistable switching means and to a means for supplying an electrical potential.

3. Apparatus as defined in claim 2 wherein said capacitor means is charged by said means for supplying said electrical potential when the output of said bistable switching means admits of said second electrical state and wherein said capacitor remains substantially uncharged when the output of said bistable switching means admits of said first electrical state.

4. Apparatus as defined in claim 3 wherein said drive means is additionally coupled to said capacitor means and is responsive to the charging of said capacitor means to supply said energizing potential to said predetermined winding.

5. Apparatus as defined in claim 1 further comprising mode control means coupled to said bistable switching means for selectively causing energizing potentials to be supplied to said fixed windings for a single cycle or for continuous motor operation.

6. Apparatus as defined in claim 5 further comprised of operator switch means admitting of first or second electrical states coupled to said bistable switching means, such that upon said operator switch means admitting of a first electrical state, said bistable switching means is activated to said first electrical state.

7. Apparatus as claimed in claim 6 further comprising detecting means responsive to translation of said translatable member for producing a stop control signal during each cycle of operation of said motor.

8. Apparatus as defined in claim 7 wherein said mode control means comprises switch means admitting of first or second electrical states and logic means responsive to said stop control signal and to said first electrical state of said switch means to detent translation of said translatable member within an initial cycle of motor operation.

9. Apparatus as defined in claim 8 wherein said logic means is coupled to said operator switch means and upon said mode control switch means admitting of said second electrical state and said operator switch means admitting of said first electrical state, said bistable switching means is activated to said first electrical state and said motor is placed in a continuous mode of operation.

10. Apparatus as defined in claim 9 wherein said logic means produce an output effective to activate said bistable switching means to said second electrical state upon said operator switch means admitting of said second electrical state and upon the application of said next succeeding stop control signal to said logic means whereby translation of said translatable member is detented within a single cycle of motor operation.

11. Apparatus as defined in claim 5 further comprising detecting means responsive to translation of said translatable member for producing a stop control signal during each cycle of operation of said motor.

12. Apparatus as defined in claim 11 wherein said detecting means comprises an optical disc adapted to be rotated by said motor interposed between means for producing radiation and radiation responsive means, said disc having an aperture therein for intermittently enabling the establishment of communication between said means for producing radiation and said radiation responsive means.

13. Apparatus as defined in claim 12 wherein said detecting means further comprises means coupled to said radiation responsive means for supplying a stop control signal to said mode control means in response to the incidence of radiation upon said radiation responsive means.

14. Apparatus as defined in claim 1 wherein said motor comprises a DC. brushless motor including commutation means having a plurality of outputs; and wherein said drive means comprises a plurality of switching means with the output of each switching means coupled to a corresponding one of said windings with the input of each switching means coupled to a corresponding one of the outputs of said commutation means.

15. Apparatus as defined in claim 14 wherein said commutation means includes a single input means coupled to the output of said bistable switch means.

* * * * *